(12) United States Patent
Gerlich et al.

(10) Patent No.: US 9,027,590 B2
(45) Date of Patent: May 12, 2015

(54) VENTILATION ARRANGEMENT FOR A FUEL TANK

(75) Inventors: Torsten Gerlich, Bensheim (DE); Gerhard Müller-Riederer, Bretzfeld (DE)

(73) Assignee: A. Kayser Automotive Systems GmbH (DE)

( * ) Notice: Subject to any disclaimer, the term of this patent is extended or adjusted under 35 U.S.C. 154(b) by 233 days.

(21) Appl. No.: 13/617,273

(22) Filed: Sep. 14, 2012

(65) Prior Publication Data

US 2013/0112290 A1 May 9, 2013

(30) Foreign Application Priority Data

Sep. 24, 2011 (DE) .......................... 10 2011 114 120

(51) Int. Cl.
| | |
|---|---|
| *F16K 31/06* | (2006.01) |
| *F16K 17/06* | (2006.01) |
| *F16K 17/196* | (2006.01) |
| *F16K 24/00* | (2006.01) |
| *F16K 15/18* | (2006.01) |
| *B60K 15/035* | (2006.01) |
| *F16K 39/02* | (2006.01) |
| *F16K 24/04* | (2006.01) |
| *B60K 15/03* | (2006.01) |

(52) U.S. Cl.
CPC ............. *B60K 15/035* (2013.01); *F16K 39/024* (2013.01); *F16K 24/04* (2013.01); *F16K 31/0655* (2013.01); *B60K 2015/03561* (2013.01); *B60K 15/03519* (2013.01); *B60K 2015/03296* (2013.01)

(58) Field of Classification Search
USPC ............. 137/493, 493.3, 493.4, 493.6, 493.9, 137/522, 601.2, 601.14, 630; 251/82, 83; 123/519

See application file for complete search history.

(56) References Cited

U.S. PATENT DOCUMENTS

| | | | | |
|---|---|---|---|---|
| 115,982 | A | * | 6/1871 | Porteous ..................... 137/493.4 |
| 526,177 | A | * | 9/1894 | Blair .......................... 137/493.4 |
| 650,725 | A | * | 5/1900 | Metzger ....................... 137/489 |
| 2,251,441 | A | * | 8/1941 | Dillman ........................ 137/316 |
| 3,154,285 | A | * | 10/1964 | Houle ......................... 251/30.04 |
| 3,424,951 | A | * | 1/1969 | Barker .......................... 361/170 |
| 4,018,314 | A | * | 4/1977 | Richmond et al. ............. 188/353 |
| 4,482,094 | A | * | 11/1984 | Knape ............................ 239/88 |
| 4,699,351 | A | * | 10/1987 | Wells ............................. 251/29 |

(Continued)

OTHER PUBLICATIONS

U.S. Appl. No. 13/224,385, filed Sep. 2, 2011, which is commonly owned with the present application.

*Primary Examiner* — John Rivell
*Assistant Examiner* — Seth W Mackay-Smith
(74) *Attorney, Agent, or Firm* — Fox Rothschild LLP

(57) ABSTRACT

A ventilation arrangement for the head space of the fuel tank of a vehicle comprises a switchable main valve intended for adjusting an arbitrary pressure in the head space of the tank. By way of the opening position of the main valve, a connection between a connection (5) intended for connection to the head space and a connection (6) intended for connection to the surrounding atmosphere is established, wherein the main valve is assigned a pilot valve, which opens during a first path element of a switching movement, wherein the main valve only opens following this first path element. Because of the small cross section of the pilot valve and the pressure relief that materialized through its opening, the switching power can be reduced and a smaller size drive can be employed.

11 Claims, 1 Drawing Sheet

(56) References Cited

U.S. PATENT DOCUMENTS

| | | | |
|---|---|---|---|
| 5,137,055 A * | 8/1992 | Matsushima et al. | 137/630.14 |
| 5,172,722 A * | 12/1992 | Nishimura | 137/599.16 |
| 5,174,463 A * | 12/1992 | Scharrer | 220/203.26 |
| 5,211,151 A * | 5/1993 | Nakajima et al. | 123/520 |
| 5,407,131 A * | 4/1995 | Maley et al. | 239/90 |
| 5,692,480 A * | 12/1997 | Kato et al. | 123/519 |
| 5,848,608 A * | 12/1998 | Ishigaki | 137/599.16 |
| 6,293,266 B1 * | 9/2001 | Oetting | 123/568.21 |
| 6,843,271 B2 * | 1/2005 | Weldon et al. | 137/487.5 |
| 2011/0168931 A1 * | 7/2011 | Sugiura et al. | 251/129.15 |

* cited by examiner

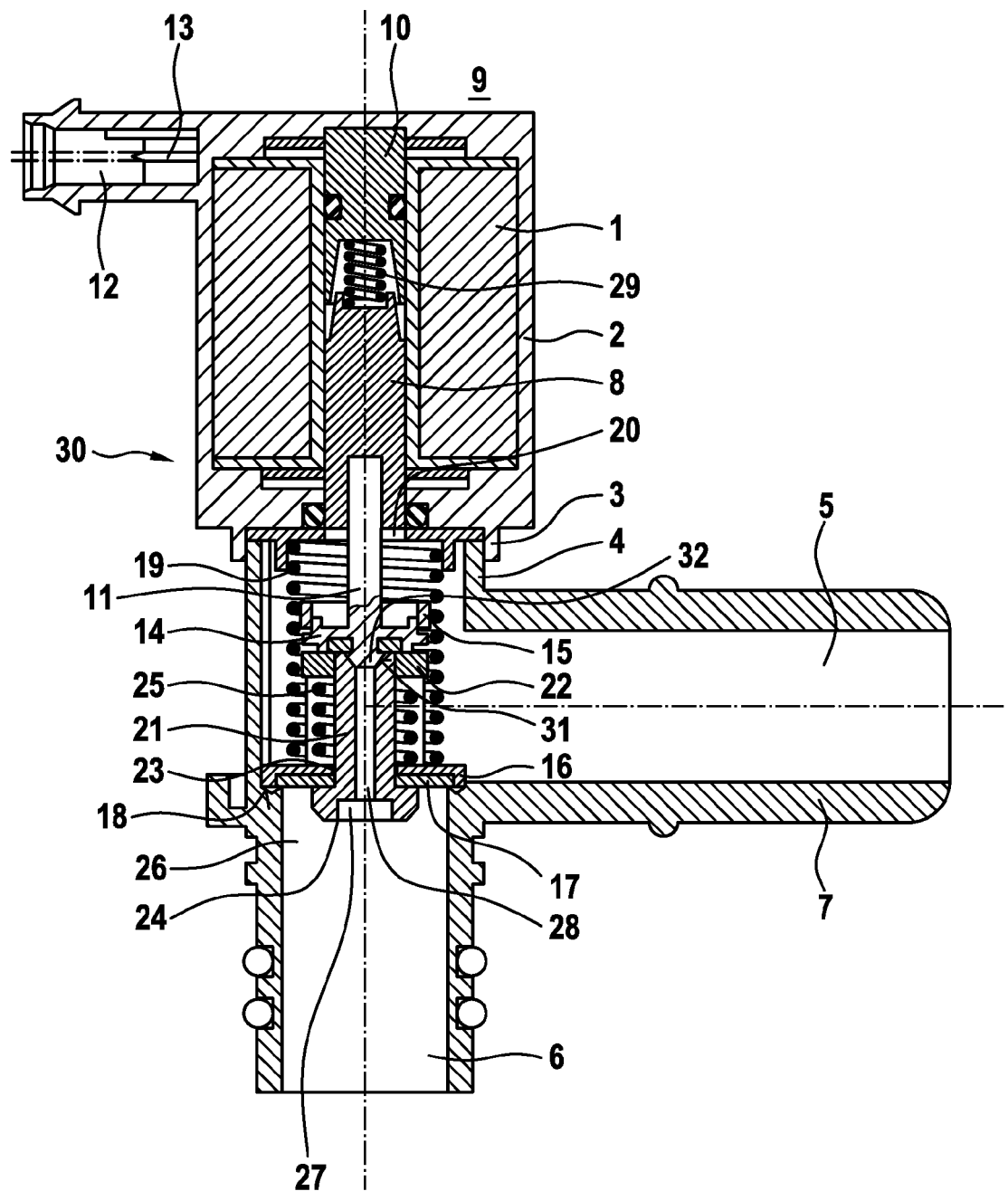

VENTILATION ARRANGEMENT FOR A FUEL TANK

BACKGROUND

The invention relates to a ventilation arrangement for a fuel tank of a vehicle.

During the course of the drive development of motor vehicles, vehicles are being developed which, besides the classic combustion engine, also include a drive that is electromotorically fed by a battery. These vehicles are also called hybrid vehicles and make possible locomotion for a certain time solely with the help of an electric motor.

The fuel required for operating the combustion engine is stored in a fuel tank, from which with the engine stationary, vapors escape because of vapor pressure differentials relative to the surrounding atmosphere, which are conducted through an activated charcoal filter inserted in a ventilation line, which is intended to adsorptively bind hydrocarbon components. With the engine running, by contrast, these retained hydrocarbon components are absorbed by inflowing air and fed to the combustion engine process of the engine, so that their escape into the environment is likewise prevented.

Since in the time of an exclusively electric operation of the vehicle, no ambient air flows through the activated charcoal filter, a regenerating of stored hydrocarbon components is not required during this time. In order to achieve an at least approximately regeneration despite the thus reduced operating time of the combustion engine, a pressure that is increased compared with the surrounding atmosphere is demanded in the head space of the fuel tank in order to reduce the amount of hydrocarbon components that have to be adsorbed in the activated charcoal filter.

It is generally known, to limit the pressure in the head space of the fuel tank by means of a pressure relief valve for safety reasons. This pressure relief valve establishes a continuous connection between the head space and the surrounding atmosphere when an overpressure or a maximum pressure occurs.

It is known, furthermore, to limit the pressure drop within the tank during the operation of the combustion engine as a result of a continuous removal of fuel through a valve, which on undershooting a minimum pressure, establishes a connection to the surrounding atmosphere and thus a pressure balance.

While refueling the vehicle, the gas volume displaced by the inflowing, liquid fuel plus fuel evaporations have to be conducted out of the tank. In the process, a pressure balance with the surroundings has to be established through a complete ventilation, since otherwise fuel is discharged from the filler tube of the tank.

However, this demand opposes the desire for an increased pressure in the fuel tank.

For operating a fuel tank in which an increased internal pressure has to be maintained, there is thus the necessity of three valves. These have to have an adequate tightness, since otherwise the pressure forming in the tank would be removed with prolonged stoppage and the conditions mentioned at the outset of a quantatively balanced adsorption and desorption of hydrocarbon components in the activated charcoal filter could not be satisfied.

From the associated main application 10 2010 044 336.0, a ventilation arrangement for a fuel tank of a vehicle is known, wherein in a housing the functions of a pressure relief valve, of a valve for ventilation for the purpose of limiting a negative pressure during the operation of the motor and that of an electromagnetically switchable valve, which is intended for producing a pressure balance with the surroundings during refueling, are combined.

For establishing preferably low flow resistances, the line cross sections, via which the ventilation arrangement is in connection with an activated charcoal filter and the head space of the tank, is dimensioned relatively large. However, this in turn results in high actuating forces even with low pressure gradients, which have to be created via the drive of the electromagnetically switchable valve. Usually, a magnetic drive or an electric motor is employed at this point, which however in view of the switching forces to be created, have to be dimensioned relatively large. The dimensioning is accompanied by a correspondingly large volume.

SUMMARY OF THE INVENTION

In view of this background it is the object of the invention to improve a ventilation arrangement for the fuel tank of a vehicle with its valves assigned to the head space for realizing a maximun non-exceeding pressure, a minimum, not undershootable, pressure, and an arbitrarily adjustable pressure in particular intended for fueling, in that a drive for the electromagnetically switchable valve integrated in the ventilation arrangement can be dimensioned weaker in terms of power and in an installation space saving manner. With such a ventilation arrangement, this object is solved through the features of the invention as described below.

It is substantial for the invention that the switching movement of the drive, starting out from the closing position of the valve to the realization of an arbitrary pressure, in the following partly also called main valve, up to its opening position, is divided into two path elements, wherein during the first path element merely a pilot valve is opened. Compared to the flow cross sections of the two mentioned connections, this is merely characterized by a small cross section, so that the energy expenditure for its opening is correspondingly low. Opening of the pilot valve however results in a reduction of the pressure gradient acting on the sealing plate of the main valve, so that altogether the switching power to be provided via the drive is correspondingly reduced. This brings with it the advantage, that a drive with a smaller installation volume can be employed.

The features of another embodiment are directed at a possible design concretization of the ventilation arrangement, in particular of the pilot valve. This is characterized by a blocking element, which interacts with a seat surface arranged on the one end of a bore of a shaft, wherein the blocking element is in connection with an armature part, the movement of which can be generated by means of an ring coil of the drive. On the one end of the shaft, a sealing head is molded on which engages behind a sealing plate, which forms an element of the main valve. For realizing the pilot valve, use insofar is made of design elements of the ventilation arrangement which are present anyhow. Thus, said ventilation arrangement can thus be made available altogether as a highly compact unit.

The features of yet another embodiment are directed at further details relating to the design realization of the two path elements. During the first path element, the main valve remains functionless and is only opened during the course of the second path element.

In further embodiments of the invention, the features are each directed at realizing the closing position of the pilot valve and of the main valve. These are brought about in the currentless state of the drive by springs in each case.

The features of additional embodiments are directed at the realization of the first path element, in particular at the actuation of the pilot valve and the main valve which commences one after the other during the switching movement of the drive starting out from the closing position.

Above, the drive was described as magnetic drive consisting of a ring coil and a plunger armature. Similarly, an electric motor can also be employed at this point.

BRIEF DESCRIPTION OF THE DRAWING

In the following, the invention is described in more detail making reference to the exemplary embodiment shown according to FIG. 1 in the drawing which shows an axial section of a valve assembly.

DETAILED DESCRIPTION OF PREFERRED EMBODIMENTS

FIG. 1 shows a valve assembly according to the invention in an axial section, consisting of a first housing part 2 receiving an ring coil 1, which at the bottom is fitted via a collar 3 to a facing section 4 of a connection 5 intended for connection to the head space of a fuel tank and to a connection 6 intended for connection to the ambient atmosphere. Both housing parts 2, 7 in the assembled state form the housing 30 that receives all components of the valve assembly.

Within the ring coil 1, extending in direction of its axis, there is located a bar-shaped armature path 8, the movement of which in the direction of a top side 9 is limited by a magnetically active stop part 10 that is arranged in a fixed manner. A coupling piece 11 that is in connection with the armature 8 protrudes out of the housing part 2 at the bottom and into the housing part 7. The housing part 2 thus mainly serves to receive the coil body of the ring coil 1.

An attachment part molded onto the top of the housing 2 is designated 12, which attachment part serves for receiving an electrical connection 13 for the ring coil 1.

The coupling piece 11 extends through an opening 20 of the housing part 7 and stands at its lower end, guided in a sliding manner via a backing disk 14 along a cage 15, which in turn is fastened to a support plate 16. The support plate 16 is designed as carrier of a sealing plate 17 preferentially consisting of a rubber-elastic material, which bears against a ring-like sealing surface 18 forming the inlet opening 26 of the connection 6. The backing disk 14 in each case is connected in a fixed manner to the coupling piece 11.

A spring, the one end of which is axially supported on the side of the support plate 16 facing away from the sealing surface and its other end on the coil element of the ring coil 1 or the housing part 2. The sealing plate 17 thus bears against the sealing surface 18 under a preload, which is defined by the spring 19, wherein through axial displacement of the mentioned coil element or the housing part 2 an adjustment of this preload is possible. For example, a screw connection can exist between the housing parts 2, 7, which in axial direction of the ring coil 1 makes possible an adjustment of the position of these housing parts relative to each other.

A shaft, which extends coaxially to the armature part 8, within which a continuous bore 28 runs likewise coaxially to the armature part 8, the end of which facing the coupling piece 11 forms a conically expanding seat surface 31 for a blocking element 32 formed complementarily to said seat surface and molded onto the facing side of the backing disk 14, is designated 21. A ring-like sealing disc preferentially consisting of an elastomer material surrounding the blocking element 32 and held on the side of the backing disk 14 facing the shaft 21, is designated 33.

A yoke, which is displaceably arranged along the cage 15 and which is in connection with the shaft 21 on its one end facing the armature part 8 is designated 22. The other end of the shaft 21 extends through a central, ring-like opening 23 of the support plate 16 and of the sealing plate 17 and is in connection on the side facing the connection 6 with a plate-like sealing head 24 bearing against the rim of the opening 23 in a sealing manner.

A further spring, the one end of which bears against the side of the yoke 22 facing the support plate 16 and the other end of which bears against the side of the support plate 16 facing the yoke 22. This spring 25 determines the preload, under which the sealing head 24 bears against the rim of the opening 23. It is evident that with the valve assembly according to the invention, three valve functions that act independently of one another are realized.

The shaft 21 in conjunction with the sealing head 24 bearing against the rim of the opening 23 under the preload of the spring 25 forms a pressure relieve valve, which in the opening position makes possible a flowing-out of gases from the head space of the fuel tank via the connection 5 and an opening 23 in the manner of a circular ring between the shaft 21 and the inner surfaces facing the latter towards the atmospheric connection 6. The overpressure within the head space, which leads for opening this pressure relief valve, is defined by the spring 25 and can be adjusted in that the shaft 21 via its screw connection with the yoke 22 can be axially moved to a greater or lesser degree. For this purpose, the sealing head 24 is equipped with an internal square profile 27 or a comparable profile determined for interaction with a screwing tool.

The system consisting of the support plate 16, of the sealing plate 17 bearing against the sealing surface 18, the cage 15 and the spring 19 forms a vacuum valve, which in the opening position makes possible the inflow of gases via the atmospheric connection 6, the inlet opening 26 and the connection 5 in the head space of the fuel tank. The vacuum within the head space, which leads to the opening of this vacuum valve, is defined by the preload of the spring 19, which is adjustable through the axial displacement of the coil element of the ring coil 1 or of the housing part 2. In the event of a screw connection between the housing parts 7, 2, this adjustment can be carried out in a particularly easy manner.

The system consisting of the ring coil 1, the armature part 8, the coupling piece 11, the backing disk 14, the cage 15, the support plate 16 and the sealing plate 17 bearing against the sealing surface 18 form an electromagnetically switchable valve, which in the opening position makes possible a continuous connection between the connections 5, 6 via the inlet opening 26. A switching position of the valve, namely the opening position, is established in the case of electrification of the ring coil 1, whereas the closing position materializes in the currentless state of the ring coil 1 under the action of the spring 19. This valve is used in order to prevent the development of an increased pressure in the head space of the fuel tank during fueling.

A spring, which is active between the stop part 10 that is arranged in a fixed manner and the armature part 8 that by contrast is movably arranged, is designated 29. The purpose of this spring consists of the following:

The system consisting of the seat surface 31, the blocking element 32 and the coupling piece 11 forms a pilot valve within the scope of the electromagnetically switchable valve, also called main valve, mentioned above, which in the non-electrified stage of the ring coil 1 is held in the closing position under the resetting force of the spring 29, in which the blocking element 32 bears against the seat surface 31 in a sealing manner, thereby closing the bore 28.

Upon an electrification of the ring coil 1, the armature part 8 is initially moved against the resetting force of the spring 29 by a first path element in the direction of the stop part 10, so that the mentioned pilot valve is transferred into its opening position, in which between the connection 6 via the bore 28 and the cage 15 a continuous connection with the connection 5 is established. Between the seat surface 31 on the one hand and the outer surface of the blocking element 32 on the other hand, there is a ring-shaped through-flow surface in this opening position of the pilot valve, which is increasingly enlarged during the opening movement along the first path element.

A through-flow of the pilot valve results in a pressure relief of the support plate 16, so that the energy expenditure for opening the inlet opening 26 is correspondingly less. Only at the end of the first path element will the backing disk 14 exert a driving action on the cage 15, namely along a second following path element up to the complete opening of the inlet opening 26.

During the opening movement along the two path elements, the pilot valve and the main valve are thus opened one after the other.

Within the cage 15, which is in a fixed connection with the support plate 16, the backing disk 14, which is in fixed connection with the coupling piece 11 and in this manner with the armature part 8, is movably arranged in a limited manner in axial direction of the coupling piece 11, namely corresponding to the dimensioning of the mentioned first path element.

As soon as an electrification of the ring coil 1 is absent, the spring 29 supported by the spring 19 exerts a resetting force on the support plate 16, which transfer the pilot valve and the main valve in the closing position.

It is evident that because of the pilot valve having a comparatively small flow cross section despite the relatively large cross sections of the connections 5, 6, the main valve, as explained above, can be actuated with a relatively low energy expenditure, so that a correspondingly small size drive is adequate.

LIST OF REFERENCE NUMBERS

1. Ring coil
2. Housing part
3. Collar
4. Section
5. Connection
6. Connection
7. Housing part
8. Armature part
9. Top
10. Stop part
11. Coupling piece
12. Attachment part
13. Connection
14. Backing disk
15. Cage
16. Support plate
17. Sealing plate
18. Sealing surface
19. Spring
20. Opening
21. Shaft
22. Yoke
23. Opening
24. Sealing head
25. Spring
26. Inlet opening
27. Internal square profile
28. Bore
29. Spring
30. Housing
31. Seat surface
32. Blocking element
33. Sealing disk

What is claimed is:

1. A ventilation arrangement for the fuel tank of a vehicle with its valves assigned to a head space for realizing a maximum non-exceedable pressure, a minimum, not undershootable pressure, and an arbitrarily adjustable pressure in particular intended for fueling, with a housing receiving at least the valve for realizing a maximum pressure and the valve for realizing a minimum pressure, an atmospheric connection intended for connection to the atmosphere and a head space connection intended for connection to the head space, wherein the valves are electromagnetically switchable for realizing an arbitrarily adjustable pressure and in connection with a drive, wherein, by means of the drive, a switching movement can be generated, which starting out from the closing position of the electromagnetically switchable valves to its opening position through a first path element is equipped for opening a pilot valve, establishing a connection with small cross section between the atmospheric and head space connections and subsequently through a second path element, for freeing an inlet opening of the atmosphere connection, realizing a continuous completely opened connection between the atmospheric and head space connections, wherein the drive consists of a ring coil, in the axial direction of which an armature part is movably guided, in that the armature part is in connection with a blocking element, which with a seat surface molded into a first shaft, forms the pilot valve, in that the blocking element by means of the drive is displaceable within a bore establishing a connection with small cross section between the atmospheric and head space connections and a position closing this connection, and in that on the first shaft, engaging behind a sealing plate, a sealing head is molded on, which is equipped for actuating the valve, which is electromagnetically switchable for realizing an arbitrarily adjustable pressure.

2. The ventilation arrangement according to claim 1, wherein a cage, which is attached to a carrier plate supporting the sealing plate, wherein starting out from the closing position of the valve for realizing an arbitrarily adjustable pressure, the blocking element by means of the drive can be transferred into its opening position starting out from its closing position during a first path element and wherein during a second path element following the first one the sealing plate, starting out from its closing position blocking the inlet opening can be transferred into its opening position.

3. The ventilation arrangement according to claim 2, wherein the blocking element is guided in a limited manner in the cage by means of a backing disk molded onto a second shaft, thereby defining the first path element.

4. The ventilation arrangement according to claim 3, wherein starting out from the closing position of the valve for realizing an arbitrarily adjustable pressure commencing with the reaching of the end of the first path element, a driving action can be exerted on the first shaft and thus the sealing plate, bringing about a completely opened connection between the atmospheric and head space connections.

5. The ventilation arrangement according claim 2, further comprising a spring holding the valve in the closing position for realizing an arbitrarily adjustable pressure.

6. The ventilation arrangement according to claim 2, further comprising a spring holding the pilot valve in the closing position.

7. The ventilation arrangement according to claim 1, further comprising a spring holding the valve in the closing position for realizing an arbitrarily adjustable pressure.

8. The ventilation arrangement according to claim 7, wherein the spring is arranged between the carrier plate and parts of the housing.

9. The ventilation arrangement according to claim 7, further comprising a spring holding the pilot valve in the closing position.

10. The ventilation arrangement according to claim 1, further comprising a spring holding the pilot valve in the closing position.

11. The ventilation arrangement according to claim 10, wherein the spring is arranged in the housing between the armature part and a fixed stop part.

* * * * *